United States Patent [19]

Muramatsu

[11] Patent Number: 4,969,008

[45] Date of Patent: Nov. 6, 1990

[54] COPYING APPARATUS WITH A PAPER REFEEDING FUNCTION AND A METHOD OF CONTROLLING IT

[75] Inventor: Hideo Muramatsu, Osaka, Japan

[73] Assignee: Minolta Camera Kabushiki Kaisha, Osaka, Japan

[21] Appl. No.: 337,556

[22] Filed: Apr. 13, 1989

[30] Foreign Application Priority Data

Apr. 15, 1988 [JP] Japan .................................. 63-92911

[51] Int. Cl.[5] ........................ G03B 27/32; G03B 27/52

[52] U.S. Cl. .......................................... 355/26; 355/51

[58] Field of Search ........................ 355/24, 26, 40, 51

[56] References Cited

U.S. PATENT DOCUMENTS

| | | | |
|---|---|---|---|
| 3,999,852 | 12/1976 | Katayama et al. | 355/26 |
| 4,123,155 | 10/1978 | Hubert | 355/26 |
| 4,218,128 | 8/1980 | Satomi et al. | 355/26 |
| 4,241,991 | 12/1980 | Brown | 355/26 |
| 4,468,114 | 8/1984 | Pels et al. | 355/26 |
| 4,639,125 | 1/1987 | Okuda et al. | 355/26 |
| 4,657,239 | 4/1987 | Ikesue et al. . | |
| 4,660,963 | 4/1987 | Stemmle . | |
| 4,745,443 | 5/1988 | Adachi et al. | 355/40 |

FOREIGN PATENT DOCUMENTS 61-254431 11/1986 Japan .

*Primary Examiner*—Monroe H. Hayes
*Attorney, Agent, or Firm*—Burns, Doane, Swecker & Mathis

[57] ABSTRACT

A copying apparatus comprising a feeding unit which can be operated in a single manual feeding mode that a sheet of copying paper set manually is fed out and in a multiple manual feeding mode that a plurality of copying paper set manually is successively fed out sheet by sheet and a refeeding unit for feeding copying paper on each sheet of which an image is formed once to an image transfer portion again. The refeeding unit is controlled, when the single manual feeding mode is selected, to perform the refeeding operation each time an image has been formed on a sheet of copying paper fed from the feeding unit, and when the multiple manual feeding mode is selected, it is controlled to perform the refeeding operation after the completion of the successive feeding and image forming operation toward all the sheets set manually.

11 Claims, 22 Drawing Sheets

COPYING APPARATUS WITH A PAPER REFEEDING FUNCTION AND A METHOD OF CONTROLLING IT

BACKGROUND OF THE INVENTION

1. Field of the Invention

The present invention relates to a copying apparatus with an automatic duplex copying function, an automatic composite copying function and a multiple copying function, wherein images can be formed on copying paper in a combined mode of manual paper feeding with the multiple copying function.

2. Description of Related Art

Copying machines which can perform automatic duplex copying operation and automatic composite copying operation are known.

In an automatic duplex copying mode and an automatic composite copying mode, after a first image is formed on one side of a sheet at an image transfer portion, the sheet is once stored in an intermediate tray without being ejected from the machine, and thereafter the sheet is fed to the image transfer portion again so that a second image can be formed on the other side of the sheet.

The size of a paper storing portion of said intermediate tray can be adapted to the size of paper to be stored therein. Paper to be fed from a feeding section such as feeding cassettes to the image transfer portion has various sizes such as B4, A4, B5, etc., so that the intermediate tray needs to meet each case.

Additionally, the data on the size of the paper, which is a necessity for determining the size of the paper storing portion of the intermediate tray, has been read out in a main control section with use of paper size indicators provided for the feeding cassettes.

Also, copying apparatuses each of which is equipped with a manual feeding unit have been provided. The manual feeding unit comprises a manual feeding port through which paper is fed to the image transfer portion manually. Even the paper which can not be stored in any of said cassettes because of its size (irregular size) can be fed with the manual feeding unit. Further, it goes without saying that the paper which can be stored in any of the cassettes can be fed with the manual feeding unit.

Also, copying apparatuses wherein a multiple copying mode can be designated have been known. The multiple copying mode is an operation mode in which the reproduction of one original document is repeated until a designated number of copies are made.

Further, copying apparatuses wherein the operation in the multiple copying mode can be performed toward paper fed through the manual feeding port (that is, copying apparatuses wherein images can be formed in a single manual feeding mode and a multiple manual feeding mode differently from each other) have been known.

With this type of copying apparatus, when a plurality of sheets whose sizes are the same are set in the manual feeding unit, and the multiple copying mode is designated with a specified key, the sheets are successively fed through the manual feeding port one by one, and the multiple copying operation is performed to form the image of an original document on the sheets being fed successively.

As mentioned above, the size of paper has been detected by the paper size indicators provided for the feeding cassettes. Accordingly, when paper is fed from the manual feeding unit, the paper size can not be detected, and the size of the paper storing portion of the intermediate tray can not be determined. For this reason, conventional copying apparatuses have been designed so that the duplex copying operation and the composite copying operation are inhibited when copying paper is fed from the manual feeding unit.

SUMMARY OF THE INVENTION

The main object of the present invention is to provide a copying apparatus, wherein images can be formed in a combined operation mode of a multiple manual feeding mode where a plurality of sheets of copying paper set on a tray manually are successively fed one by one and a multiple copying mode, and a method of controlling this type of apparatus.

To attain the above object, a copying apparatus according to the present invention comprises image forming means provided with an image transfer portion for transferring images onto copying paper, feeding means for feeding copying paper to the image transfer portion which can be operated in a first mode where a sheet of copying paper set in a tray manually is fed out and in a second mode where a plurality of copying paper set on the tray manually are successively fed out sheet by sheet, refeeding means for feeding the copying paper each sheet on which an image is formed on one side, to the image transfer portion again, mode section means for selecting the first mode or the second mode, first control means for controlling the refeeding means, when the first mode is selected, to perform the refeeding operation each time the image forming operation toward a sheet of copying paper fed from the feeding means is completed, and second control means for controlling the refeeding means, when the second mode is selected, to perform the refeeding operation after the completion of the successive feeding and image forming operation toward all the sheets of copying paper set on the tray manually.

In a method of controlling a copying apparatus according to the present invention, basically, copying paper set on a tray manually is fed to the image transfer portion of the image forming means to have an image printed thereon, and further the copying paper is fed to the image transfer portion again. First, either the first mode, where a sheet of copying paper set on the tray manually is fed, and the second mode, where a plurality of copying paper set on the tray are manually successively fed sheet by sheet, is designated, and the paper feeding operation in the selected mode is performed to feed the copying paper to the image transfer portion. When the first mode is selected, the refeeding operation is performed each time an image has been formed on a sheet of copying paper fed out from the tray and when the second mode is selected, the copying paper set on the tray manually is successively fed sheet by sheet, and after the completion of the successive feeding and image forming operation toward all the sheets, the refeeding operation is performed.

Further, the refeeding means of the copying apparatus according to the present invention comprises an intermediate tray for storing copying paper on which images are formed and means for regulating the copying paper fed into the intermediate tray, in a specified position.

Also, the feeding means of the copying apparatus according to the present invention comprises detection means for detecting the copying paper set on the tray manually, and the second control means thereof judges from a signal outputted from the detection means that the feeding of all the copying paper is completed.

With the above described constitution and method of controlling, the copying operation can be performed even when the multiple manual feeding mode where a plurality of copying paper is successively fed sheet by sheet is combined with the multiple copying mode that a plurality of copies are made per one original document.

BRIEF DESCRIPTION OF THE DRAWINGS

These and other objects and features of the present invention will become apparent from the following description taken in conjunction with the preferred embodiment thereof with reference to the accompanying drawings.

The drawings show an embodiment of a copying apparatus according to the present invention.

Figure 17:
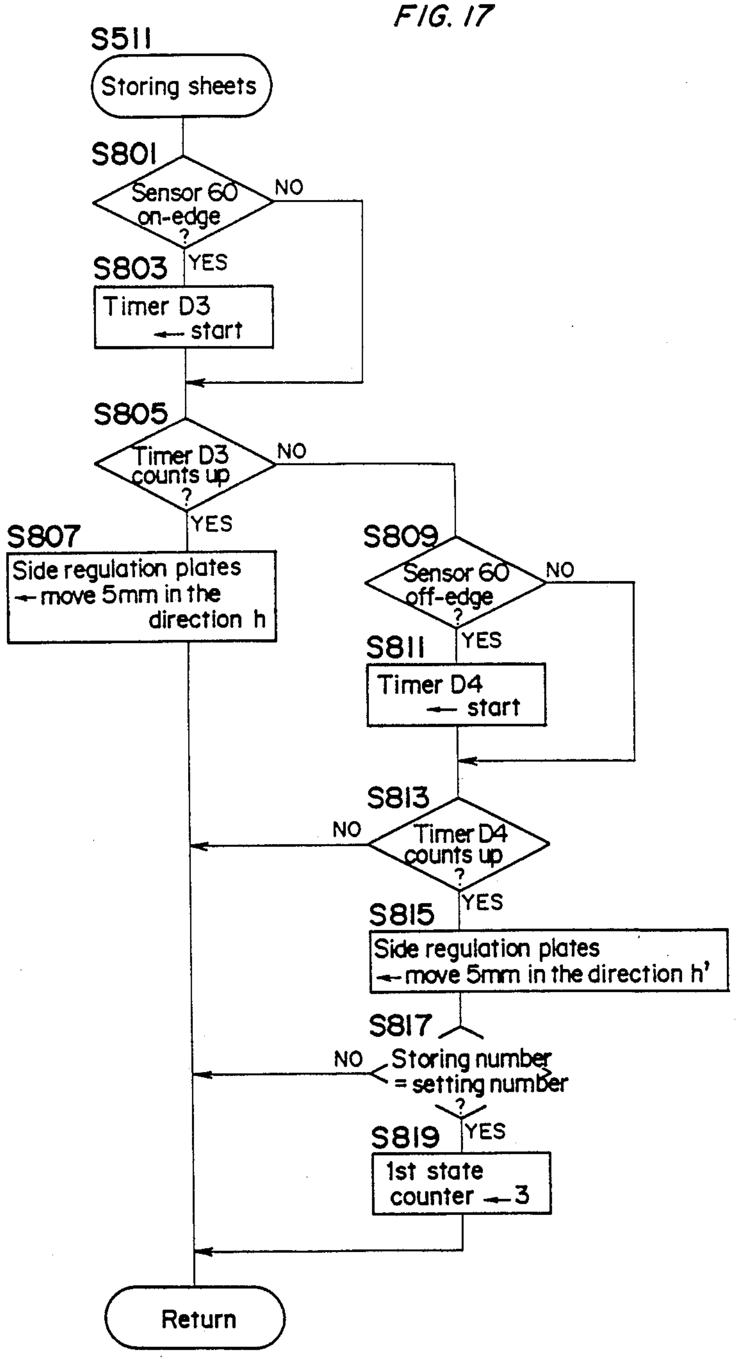
Figure 18:
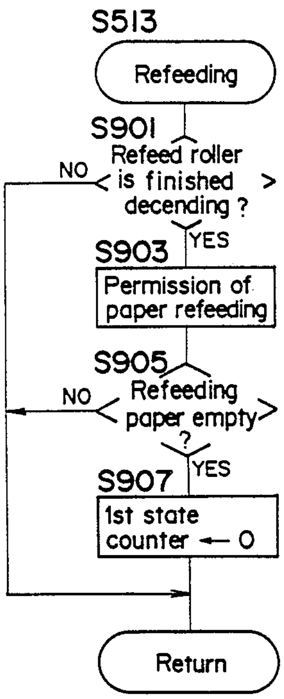
Figure 19:
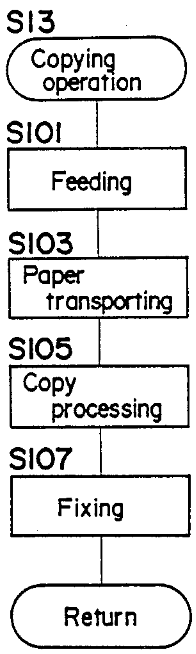
Figure 20:
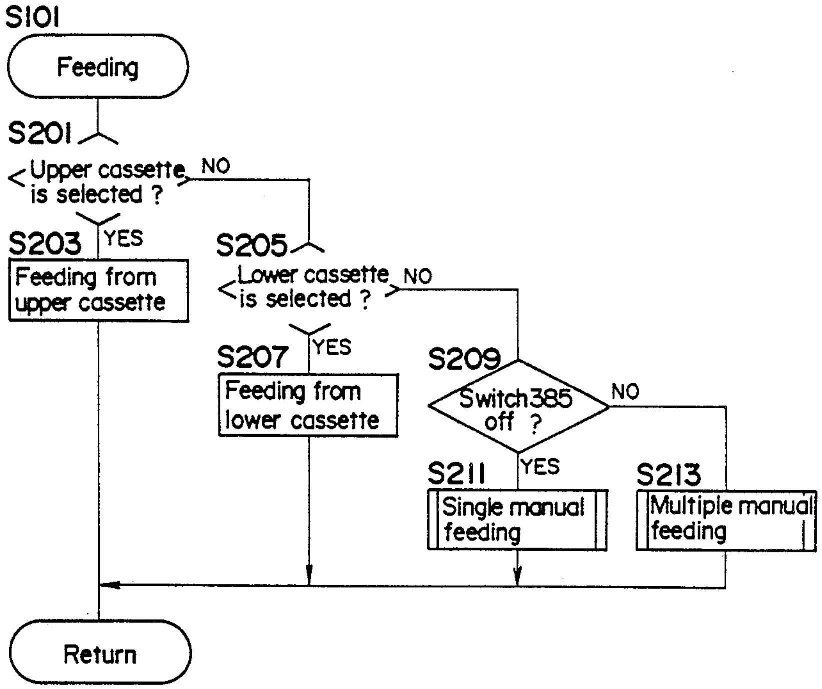
Figure 22A:
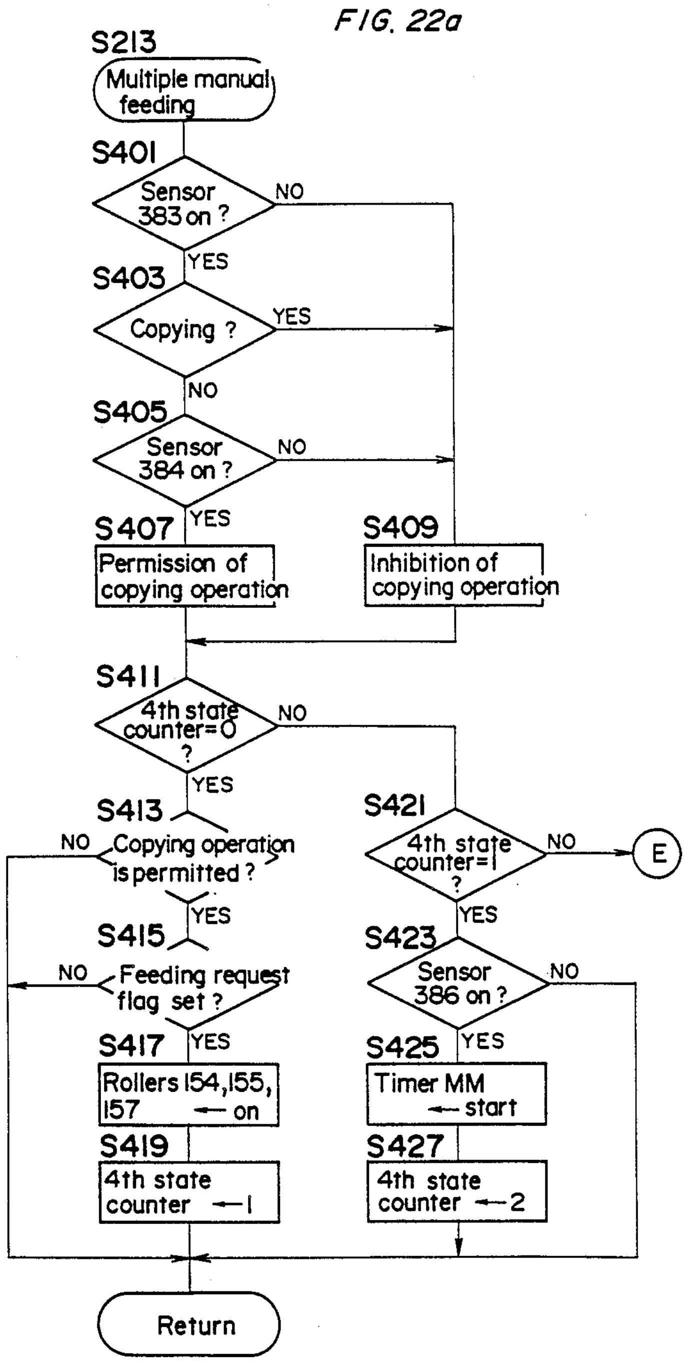
Figure 22B:
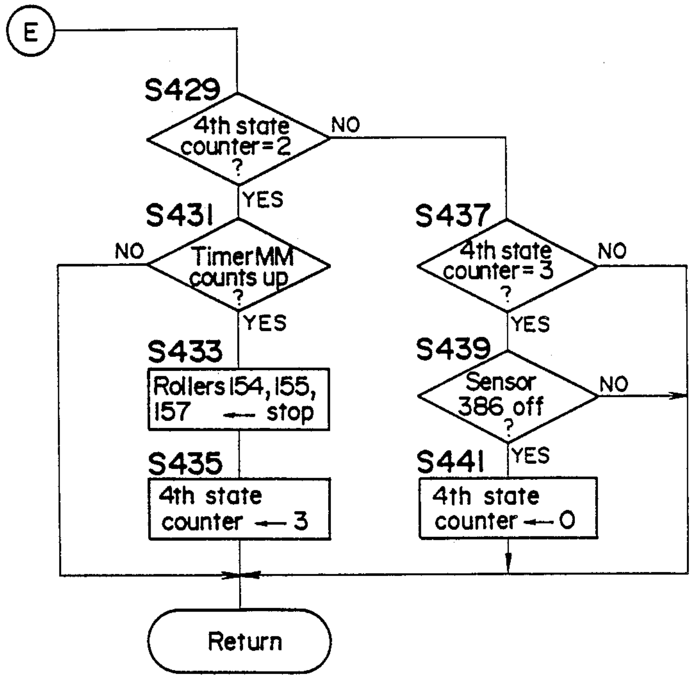

FIGS. **16*a* and 16*b*** are flowcharts showing a subroutine for storing the first sheet;

FIG. 17 is a flowchart showing a subroutine for storing sheets;

FIG. 18 is a flowchart showing a subroutine for the refeeding operation;

FIG. 19 is a flowchart showing a subroutine for the copying operation;

FIG. 20 is a flowchart showing a subroutine for the feeding operation;

FIGS. **21*a* and 21*b* are flowcharts showing a subroutine for the single manual feeding operation; and FIGS. 22*a* and 22*b*** are flowcharts showing a subroutine for the multiple feeding operation.

DETAILED DESCRIPTION OF THE PREFERRED EMBODIMENT

An embodiment of a copying apparatus according to the present invention is described below referring to the accompanying drawings.

(Constitution of the Copying Machine)

Figure 1:
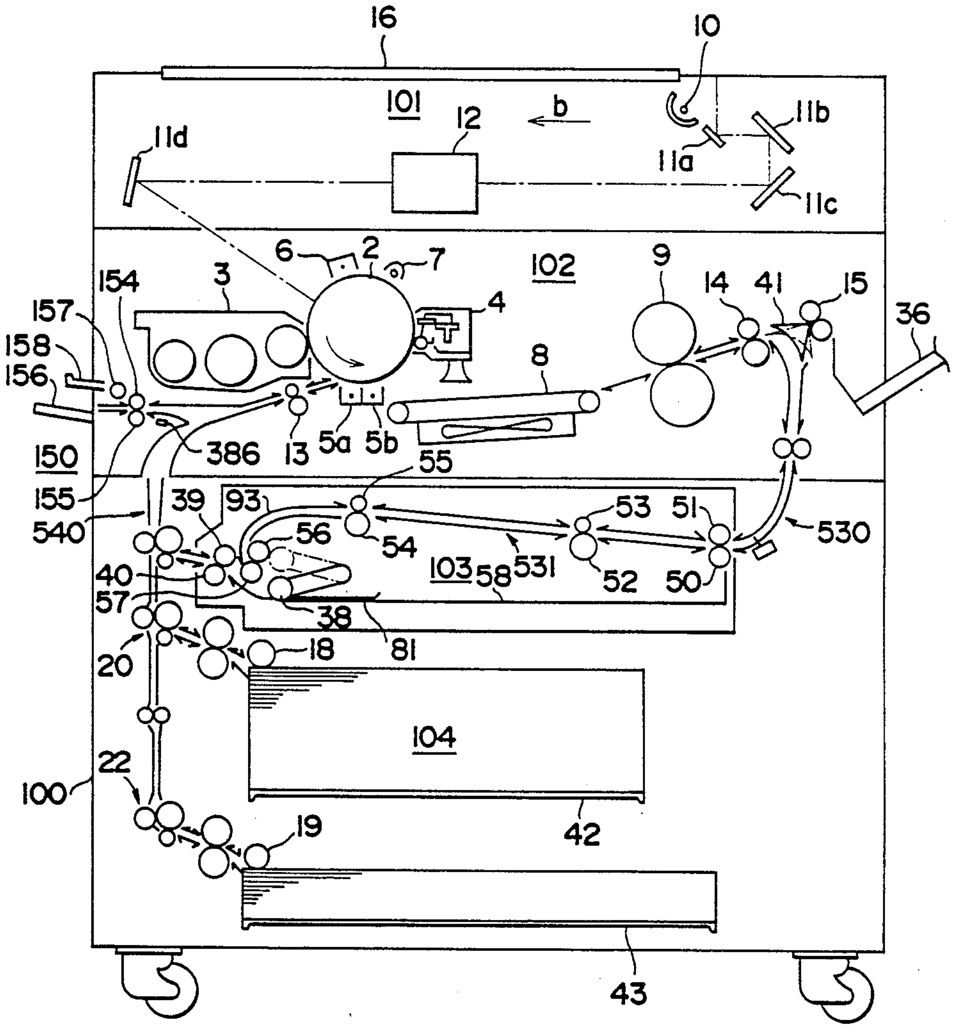
FIG. 1 is an internal view showing the composition of a copying machine.

A copying machine shown in FIG. 1 is constituted so that an optical system 101, an image forming section 102, a refeeding unit 103 and a feeding unit 104 are arranged in the upper part, in the middle part, in the lower part and in the bottom part respectively. Also, a manual feeding section 150 is arranged on the left side of the machine in FIG. 1.

Optical System 101:

The optical system 101 exposes and scans an original document placed on an original document glass 16 and projects the reflected photo image of the original document on to a photosensitive drum 2 of the image forming section 102.

The optical system 101 comprises an exposure lamp 10, reflectors **11*a*, 11*b*, 11*c*, 11*d* and a lens 12. The exposure lamp 10 and the reflector 11*a* are reciprocated at a speed of V/N (V: peripheral speed of the photosensitive drum 2, N: copying magnification) and also the reflectors 11*b* and 11*c* are reciprocated at a speed of V/2N respectively along the bottom surface of the original document glass 16 to expose and scan an original document. Further, the copying magnification is designated by the adjustment of the position of the lens 12, and the position where an image is projected is amended by the adjustment of the angle of the reflector 11*d***.

Image Forming Section 102:

The image forming section 102 performs the so-called electrophotographic process of forming an image wherein a static latent image formed on the photosensitive drum 2 is developed with toner, the toner image is transferred onto a sheet of copying paper, the transferred image is fixed thereon and then ejected.

The image forming section 102 comprises the photosensitive drum 2 which can be rotated counterclockwise in FIG. 1, an erasing lamp 7, an electric charger 6, a developing device 3, a transfer charger **5*a*, a paper releasing charger 5*b* and a cleaning device 4 which are arranged around the photosensitive drum 2, a conveyer belt 8 for transporting copying paper onto which images have been transferred, and a fixing device 9 for fixing the toner images on the transported copying paper. Additionally, a pair of timing rollers 13 functions to feed copying paper to between the photosensitive drum 2 and the transfer charger 5*a* at a specified timing synchronized with the rotation of the photosensitive drum 2. Pairs of rollers 14 and 15 function to eject copying paper on which images have been fixed from the image forming section 102**.

Whether copying paper is ejected from the image forming section 102 onto an ejection tray 36 or into an intermediate tray 58 is determined by a diverting lever 41 driven by a solenoid not shown in the drawings.

Refeeding Unit 103:

The refeeding unit 103 is used for the composite copying operation and the duplex copying operation.

Copying paper each sheet of which has a first image on one side thereof is transported to the intermediate tray 58 to be stored therein once through a paper path 530 in a case of the composite copying operation and through the paper path 530 and another paper path 531 in a case of the duplex copying operation. That is, the copying paper is stored in the intermediate tray 58 with its face down in a case of the composite copying operation and with its face up in a case of the duplex copying operation. Thereafter, the copying paper is drawn by a refeeding roller 38 to come off the tray 58 and reaches the pair of timing rollers 13 passing through pairs of rollers 39, 40 and a feeding path 540, and then the transference and the fixation of a second image onto the copying paper are executed.

The detailed description of the refeeding unit 103 will be given later.

Feeding Unit 104:

The feeding unit 104 is provided with an upper feeding cassette 42 and a lower feeding cassette 43 so that different sizes of sheets can be stored separately. The paper in each cassette is drawn by feeding rollers 18 and 19 to come off the cassette and is fed to the pair of timing rollers 13 of the image forming section 102 by automatic feeding mechanism 20 and 22. Thereafter, the paper is fed to between the photosensitive drum 2 and the transfer charger 5*a* synchronized with the rotation of the photosensitive drum 2 in response to a specified timing signal based on the movement of the optical system 101, and then the image forming operation as described above is performed toward the paper.

Manual Feeding Unit 150:

The manual feeding unit 150 is arranged in the left side of the copying machine in FIG. 1. The details of the manual feeding unit 150 are shown by FIGS. 9 and 10.

The manual feeding unit 150 comprises a manual feeding table 156 protruded outside of a housing of the copying machine, and a lever 158 arranged over the manual feeding table 156. An edge (the right edge in the figure) of the lever 158 is connected to a shaft of a manual pick-up roller 157 through a mechanism not shown in the drawings, and thereby the lever 158 controls the roller 157 to move up and down. Also, on the other edge ( the left side in the figure) of the lever 158, a multiple manual feeding switch 385 for designating the multiple manual feeding mode is disposed.

Figure 9:
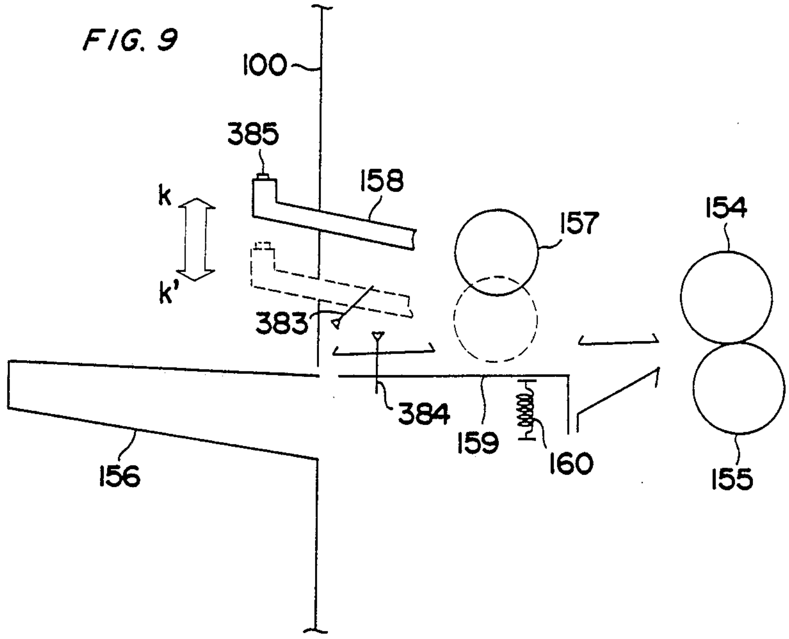
FIGS. 9 and 10 are elevational views of a manual feeding section, FIG. 9 of which shows the state where a lever is pushed up, FIG. 10 of which shows the state where the lever is pushed down.

In operating in the single manual feeding mode (when the switch 385 is off), the lever 158 and the pick-up roller 157 are at the respective positions shown by solid lines in FIG. 9. In this state, when a sheet of copying paper to be fed manually is placed on a movable guide 159 through the manual feeding table 156, the sheet is detected by a sensor 384. Thus, when the sensor 384 is turned on, the paper feeding operation in the single manual feeding mode, which will be described later, is started.

Figure 10:
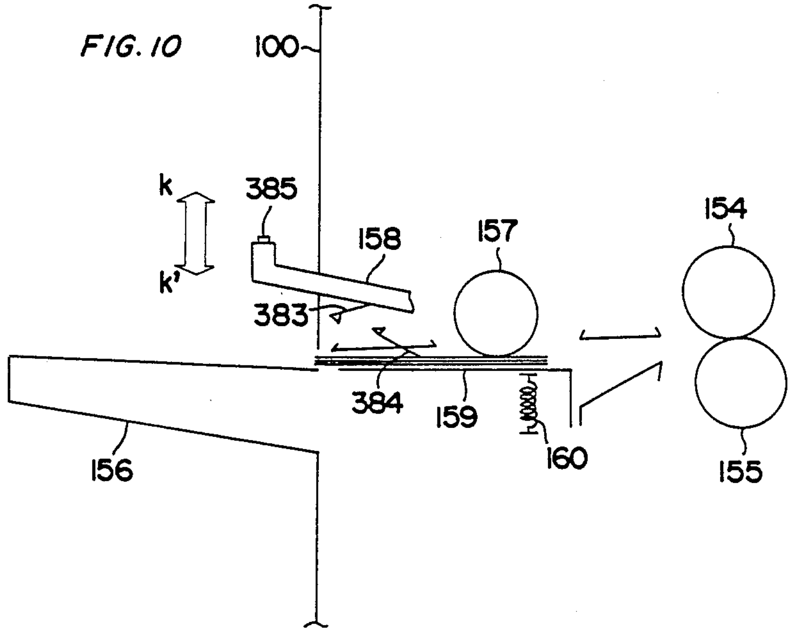

On the other hand, in operating in the multiple manual feeding mode (when the switch 385 is on), first, with the lever 158 and the pick-up roller 157 at the respective positions shown by solid lines in FIG. 9, many sheets of paper whose sizes are same are then placed on the movable guide 159 through the feeding table 156 (Refer to FIG. 10). Thereby, the sensor 384 is turned on. The movable guide 159 is urged upward by a spring 160. Next, the lever 158 (and accordingly the pick-up roller 157) is pushed down to the position shown in FIG. 10 (shown by a dashed line in FIG. 9) Thereby, the sensor 383 is turned on, and the sheets of paper are nipped between the movable guide 159 and the pick-up roller 157. Thus, the switch 385, the sensor 383 and the sensor 384 are turned on respectively, and thereby a control mechanism of feeding paper in the multiple manual feeding mode, which will be described later, is actuated.

(Refeeding Unit)

Figure 2:
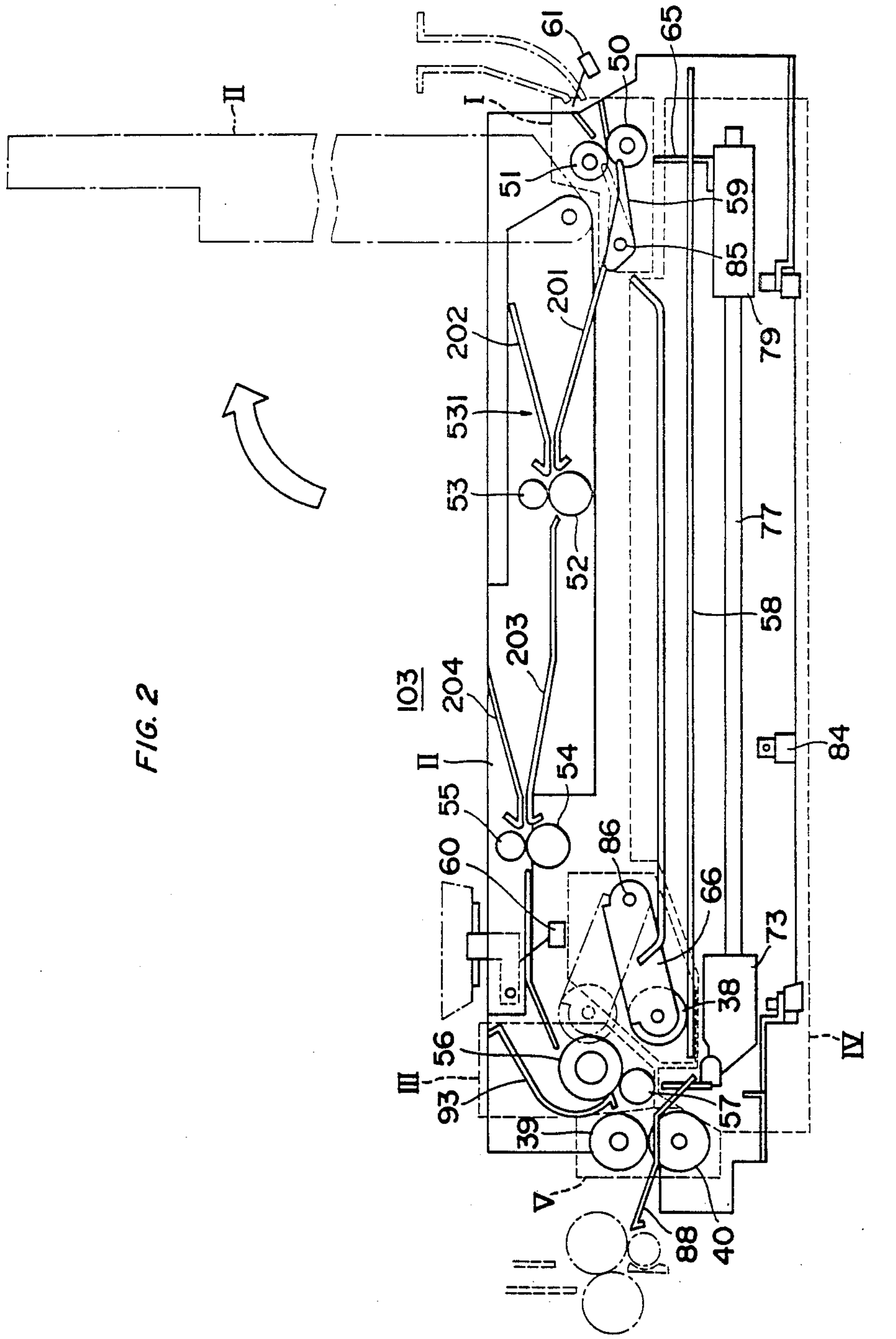
FIG. 2 is an elevational view of a refeeding unit of the copying machine.
Figure 3:
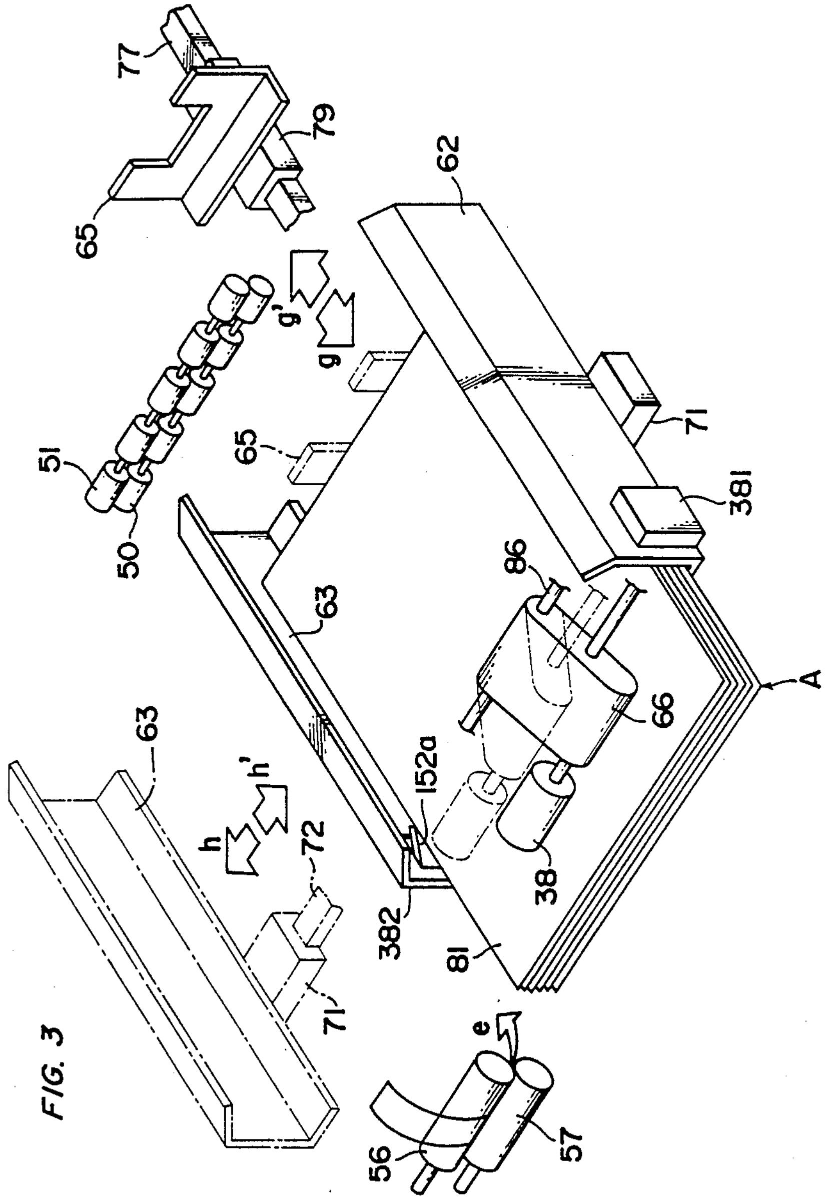
FIG. 3 is an exploded perspective view of the refeeding unit.
Figure 4:
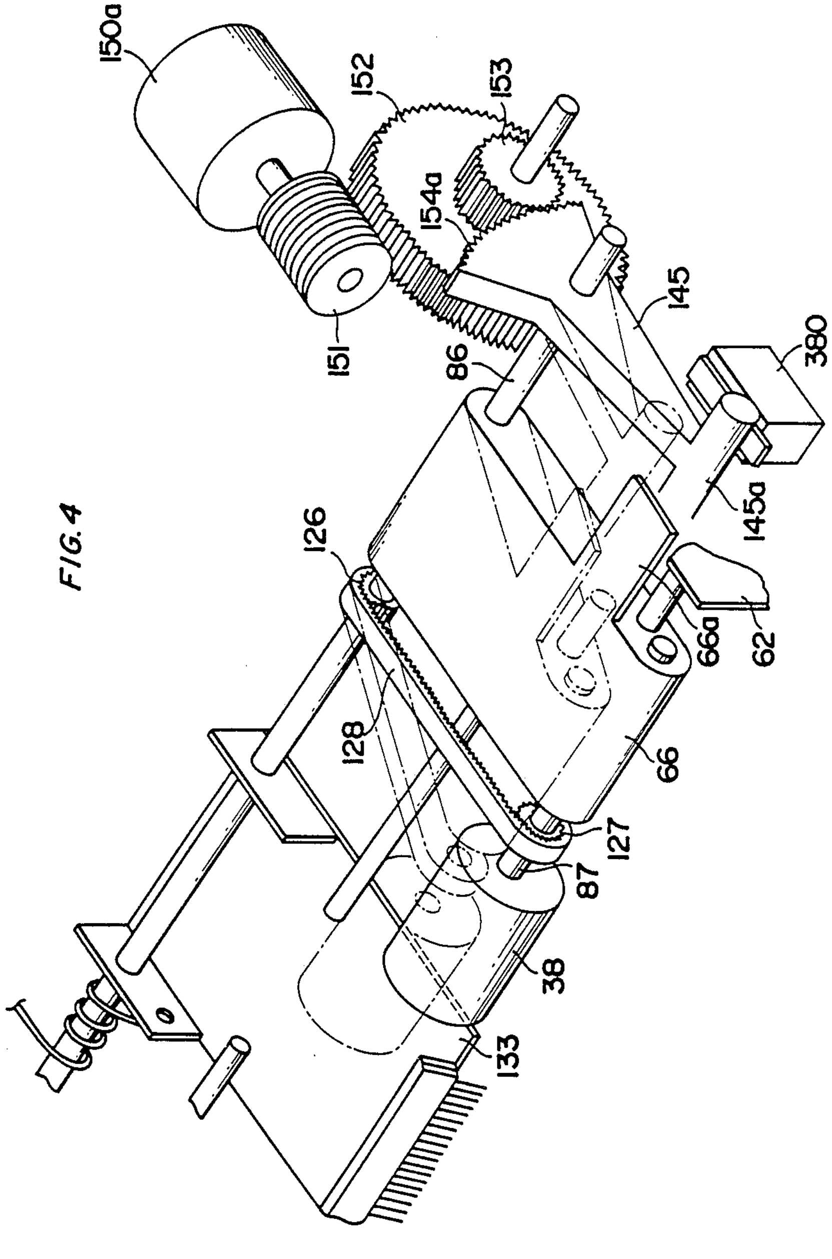
FIG. 4 is a perspective view of a refeeding roller and its neighborhood.
Figure 5:
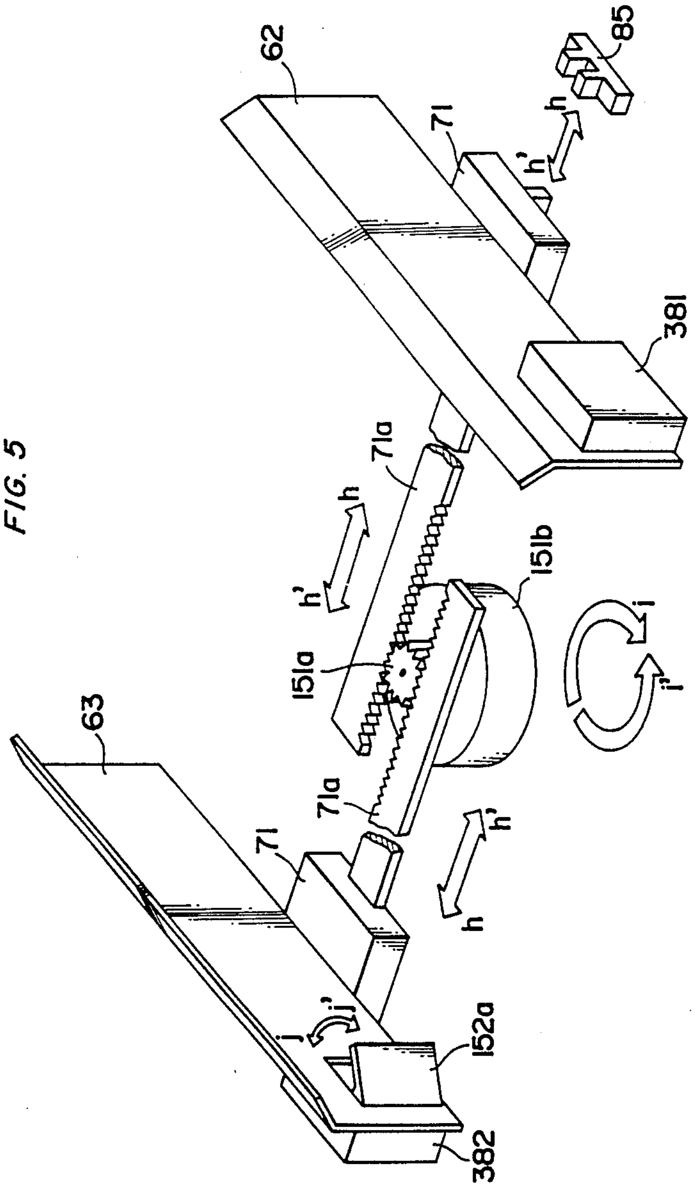
FIG. 5 is a perspective view of side regulation plates and their drive mechanism.

FIG. 2 is an elevational view of the refeeding unit 103 showing its internal composition; FIG. 3 is an exploded perspective view of the refeeding unit 103; FIG. 4 is a magnified perspective view of the neighborhood of the refeeding roller 38; FIG. 5 is a perspective view of a drive mechanism of side regulation plates 62 and 63. The composition of the refeeding unit 103, the operation of each member and mechanism for refeeding copying paper accompanying the copying operation and so on are herewith described mainly in connection with the operation in the duplex copying mode. However, the similar control and operation system can be substantially adapted to the operation in the composite copying mode within the scope of the present invention.

Outline of the Mechanism:

The refeeding unit 103 shown in FIG. 2 comprises a diverting block 1, a transporting block 11, a reversing block III, an aligning/tray block IV and a refeeding block V, and these blocks are unified in a body.

The diverting block I functions to divert the transport route of copying paper according to the selected mode from the duplex copying mode and the composite copying mode, and it comprises transport rollers 50, 51 and the diverting lever 59 which is turned on a shaft 85. Additionally, this diverting block I can be installed in the machine body separated from the refeeding unit 103.

The transporting block 11 forms the paper path 531 through which copying paper is transported in the case of the operation in the duplex copying mode. The transporting block II comprises transport rollers 52, 53, 54, and 55, and guide plates 201, 202, 203 and 204.

The reversing block 111 comprises reverse transporting roller 56, 57 and a reverse guide 93, and it functions to reverse copying paper transported through the transporting block II and feed the paper to the intermediate tray 58.

The aligning/tray block IV comprises the intermediate tray 58, a guide rail 77, slide members 73, 79, the regulation plates 62, 63 and 65 (Refer to FIG. 3.), and it functions to align the copying paper fed into the intermediate tray 58.

The refeeding block V comprises a holder 66, the refeeding roller 38, separation rollers 39, 40 and a guide plate 88, and it functions to refeed the copying paper aligned on the intermediate tray 58 sheet by sheet.

Operation in the Duplex Copying Mode and the Composite Copying Mode:

In a case of the operation in the duplex copying mode, the diverting lever 59 is set at the position shown by a solid line in FIG. 2. Copying paper is fed to the transporting block II guided by the upper surface of the lever 59 and then transported toward the left side in FIG. 2 by the transport rollers 52, 53, 54 and 55 guided by the guide plates 201, 202, 203 and 204. Thereafter, the copying paper is diverted by the divert transporting roller 56, 57 and the diverting guide 93 and fed onto the intermediate tray 58 with its face up. The copying paper fed onto the intermediate tray 58 in this way is aligned thereon and then refed to the image forming section 102 sheet by sheet by the clockwise rotation of the refeeding roller 38.

On the other hand, in the case of the operation in the composite copying mode, the diverting lever 59 is set at the position shown by an alternate long and short dashed line in FIG. 2. In this case, copying paper is guided by the lower surface of the lever 59 to be directly, without passing through the transporting block II, fed to the intermediate tray 58 through the right side of the tray 58 with its face down. Thereafter, the copying paper is aligned on the intermediate tray 58 and refed to the image forming section 102 sheet by sheet by the clockwise rotation of the refeeding roller 38 in the same manner as that in the operation in the duplex copying mode.

Composition and Movement of the Refeeding Roller (FIG. 4):

The refeeding roller 38 which can oscillate on a shaft 86 supporting the holder 66 is put in position with three steps. That is, when copying paper is fed onto the intermediate tray 58, the refeeding roller 38 is positioned at the top position or the middle position, and when refeeding the copying paper (when the refeeding roller 38 feeds the copying paper), the refeeding roller 38 comes down onto the copying paper by its own weight to provide the copying paper with proper pressure.

The three-step positioning of the refeeding roller 38 is performed as follows.

At an edge of the shaft 86 of the holder 66, an oscillating lever 145 is rotatably supported by the shaft 86, and a tab 66a protruded from the edge of the holder 66 touches a bar 145a (left downward in the figure) of the lever 145 on the upper part. Accordingly, when the lever 145 turns clockwise in the figure, the holder 66, which is supported by the bar 145a of the lever 145 through the tab 66a, is oscillated upward in the figure. The rotating force of the lever 145 is given by a stepping motor 150a through a worm gear 151, a worm wheel 152 and a super gear 153. The worm gear 151 is fixed on an output shaft of the stepping motor 150a. The worm wheel 152 and the super gear 153 are designed to rotate in a body, and the worm wheel 152 and the super gear 153 engage with the worm gear 151 and a fan gear 154a formed on the tail (right upward in the figure) of the lever 145 respectively.

The refeeding operation of copying paper (the feeding of the paper from the intermediate tray 58) is performed as follows.

As shown in FIG. 4, the refeeding roller 38 is rotatably fastened to the side of the head of the holder 66 through a shaft 87 which rotates together with the roller 38 in a body, and the shaft 87 is connected to the shaft 86 through pulleys 126, 127 and a timing belt 128. Also, the shaft 86 is connected to an output shaft of a main motor not shown in the drawings through a refeeding clutch. Accordingly, when the refeeding clutch is turned on to drive the shaft 86 into rotating, the drive force is transmitted to the refeeding roller 38 through the pulleys 126, 127 and the timing belt 128, and as a result the refeeding roller 38 is rotated clockwise to feed out the copying paper from the intermediate tray 58.

Further, sheets of the copying paper fed out from the intermediate tray 58 by the refeeding roller 38, as mentioned above, are separated by the separation rollers 39 and 40 from each other and guided to the image forming section 102 by the guide plate 88 one by one to be projected to the image transferring operation.

Alignment of Copying Paper (FIGS. 3 and 5):

The alignment of copying paper in the intermediate tray 58 is performed by the motion of the side regulation plates 62, 63 and the back regulation plate 65.

The back regulation plate 65 equipped with two tabs, as shown in FIG. 3, is arranged on the slide member 79, which is disposed on the guide rail 77 protruded in the direction of the paper feeding. When the slide member 79 is driven by a stepping motor not shown in the drawings to slide on the guide rail 77, the back regulation plate 65 is moved in the directions of arrows g and g'.

The side regulation plates 62 and 63 are arranged on guide rails 72, which are protruded in the direction perpendicular to the paper feeding direction, through slide members 71 respectively. When the slide members 71 are driven by a motor 151b (shown in FIG. 5) to slide on the guide rails 72, the side regulation plates 62 and 63 are moved in the directions of arrows h and h'.

For example, as shown in FIG. 5, when the motor 151b is turned in the direction of arrow i, racks 71a which engage with a pinion 151a fixed on an output shaft of the motor 151b are moved in the directions of arrows h respectively. As a result, the slide members 71 unified with the racks 71a are moved in the directions of arrows h respectively, whereby the distance between the regulation plates 62 and 63 becomes larger. The positions of the regulation plates 62 and 63 at which the distance between themselves is the largest is their home positions.

Also, the motion of the regulation plates 62 and 63 in the directions of arrows h' respectively, whereby the distance between the regulation plates 62 and 63 becomes smaller, is performed by the running of the motor 151b in the direction of arrow i'.

Arrow e in FIG. 3 denotes the direction in which copying paper is fed to reach the intermediate tray 58 under the operation in the duplex copying mode.

The timing of stopping the above described motion of the side regulation plates is taken as follows.

As shown in FIGS. 3 and 5, contact detection sensors 381 and 382 for detecting the contact of the side regulation plates 62 and 63 with copying paper in the tray 58 are arranged at the edges (left downward in the figures) of the regulation plates 62 and 63 respectively.

For example, when the side regulation plates 62 and 63 are moved to reduce the distance between themselves, and copying paper in the tray 58 pushes actuators 152a (plates disposed inside of the respective regulation plates 62 and 63, which can move in the directions of arrows j and j' and are urged in the direction of arrow j' in FIG. 5), the sensors 381 and 382 detect the actuators 152a being pushed in the direction of arrow j.

Figure 6:
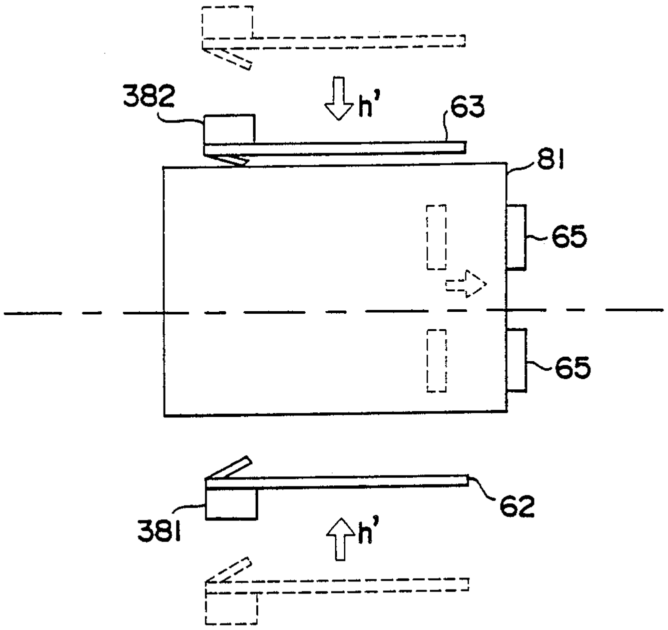
FIGS. 6, 7 and 8 are explanatory views of the side regulation plates and paper showing the positional relation between them, FIG. 6 of which shows the state where one of the regulation plates comes into contact with the paper, FIG. 7 of which shows the state where both of the regulation plates come into contact with the paper, FIG. 8 of which shows the state where the regulation plates get back in preparation for the next storing operation.
Figure 7:
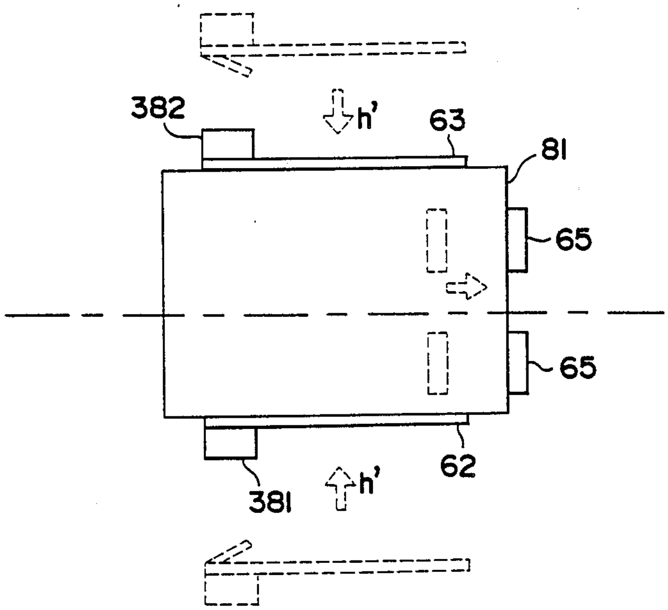
Figure 8:
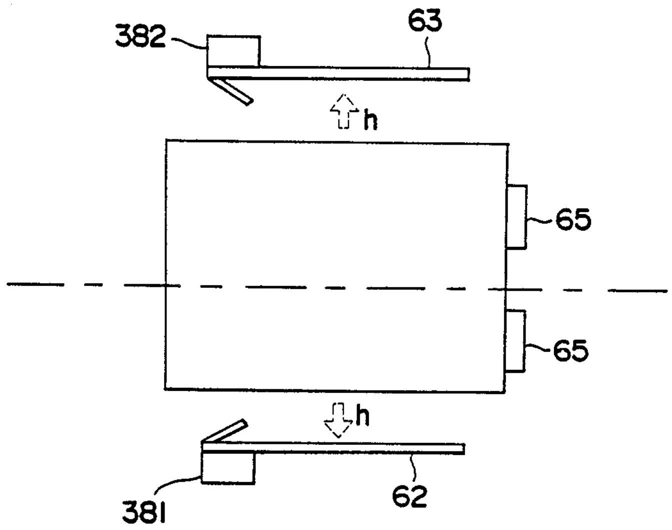

In response to detection signals outputted from the sensors 381 and 382, the copying paper in the intermediate tray 58 is positioned at the center as shown in FIGS. 6 through 8. That is, when a sheet of paper 81 is fed into the tray 58, the regulation plates 62 and 63 are started moving from their home positions (shown by a dashed line in the figures) in the directions of arrows h'. After starting the motion, one of the regulation plates 62 and 63 (the regulation plate 63 in the figures) comes into contact with the sheet 81 (FIG. 6), but the motion of the regulation plates 62 and 63 is still continued in this state. When both of the regulation plates 62 and 63 touch the sheet 81 (FIG. 7), the regulation plates 62 and 63 are stopped moving. That is, in this stage, the sheet 81 has been positioned at the center.

Further, in advance of receiving the second and successive sheets, as shown in FIG. 8, both of the regulation plates 62 and 63 are moved in the directions of arrows h respectively to be put a specified distance away from each other (are moved 5 millimeters in this embodiment), affording to receive the next sheet.

(Control Panel)

Figure 11:
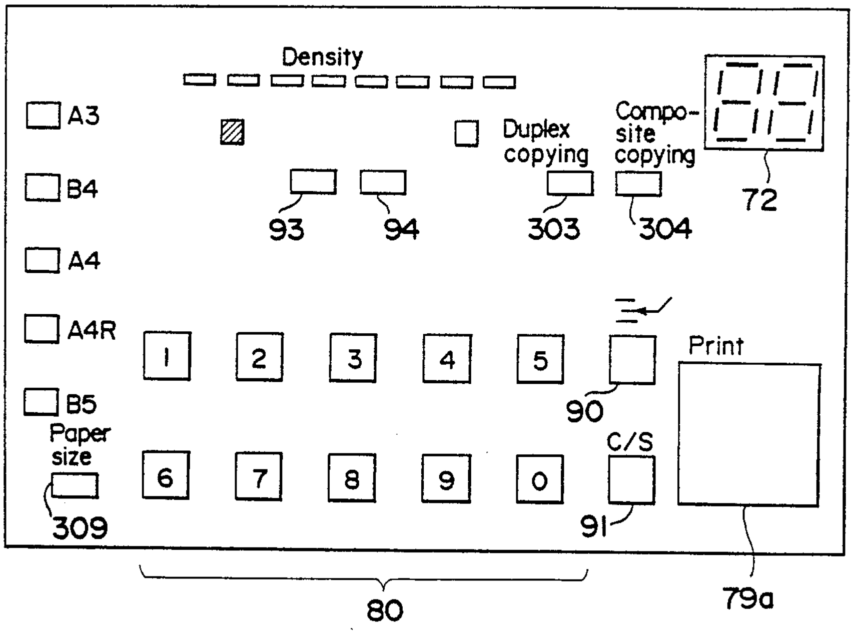
FIG. 11 is a plan view of a control panel.

FIG. 11 is a plan view of a control panel of the copying machine.

On the panel, a ten-key 80 for setting the number of copy sets to be made, a print key 79*a* for commanding the start of the printing, an interruption key 90 for commanding interruption copying operation, a clear/stop key 91, a paper selection key 309 for selecting the sheet size of copying paper, up/down keys 93 and 94 for determining the copying density, an indicator 72 for indicating the number of copy sets to be made with segmentation, a duplex copying mode selection key 303 for selecting the duplex copying mode, and a composite copying mode selection key 304 for selecting the composite copying mode, etc. are provided.

(Control Circuitry)

Figure 12:
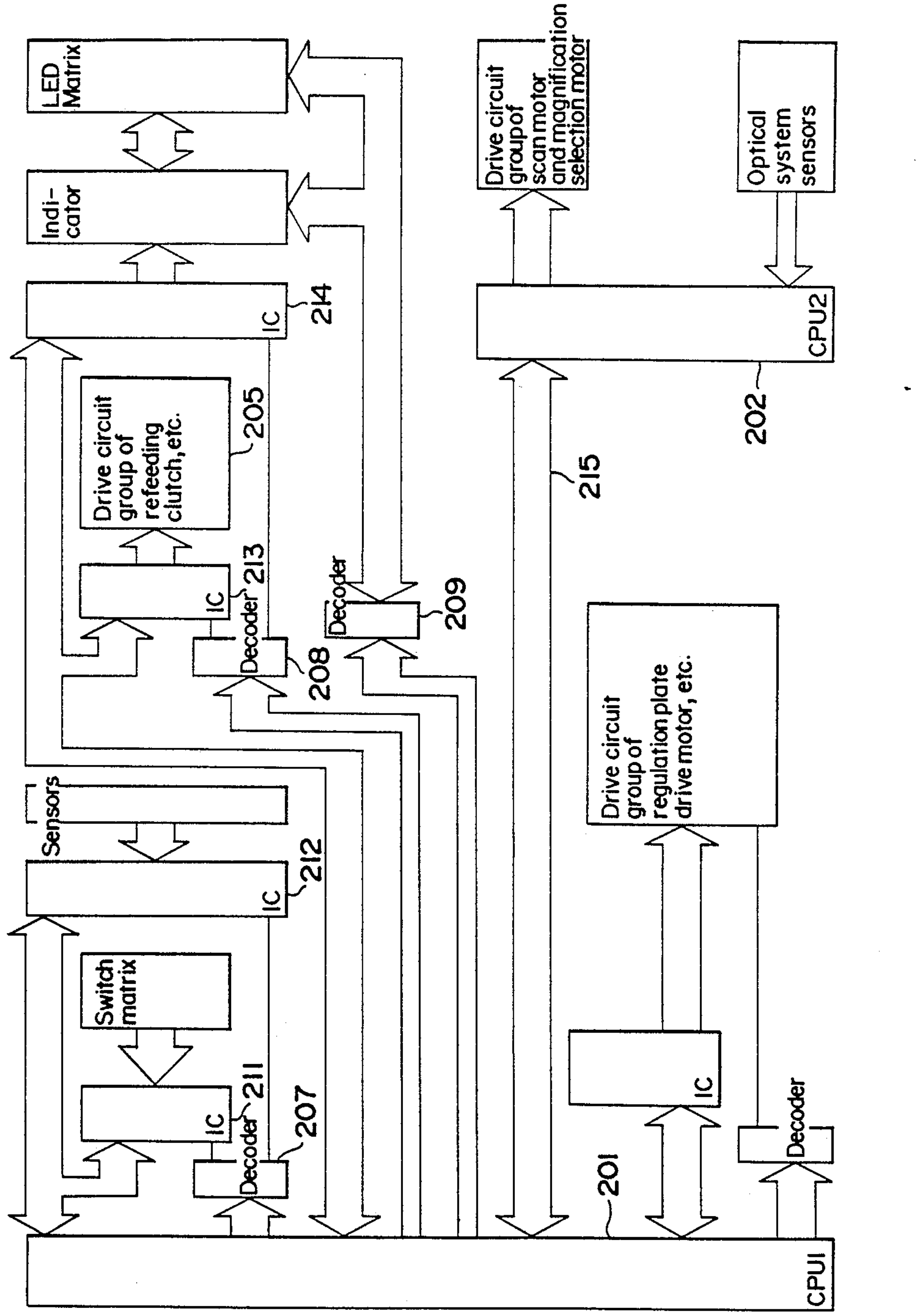
FIG. 12 is a block diagram showing a control circuitry of the copying machine.

FIG. 12 is a block diagram of a circuitry controlling the operation of the copying machine.

The control circuitry is mainly composed of a first CPU 201 controlling the image forming section 102, the refeeding unit 103 and the feeding unit 104 and a second CPU 202 controlling the optical system 101.

Signals generated from every key-switch on the control panel, the multiple manual feeding switch 385 and each sensor which is arranged at each place in the machine to detect the state of the machine are inputted into the first CPU 201 through input expansion integrated circuits 211 and 212.

From the first CPU 201, control signals over a drive circuit group 205 which drives the main motor, a develop motor, each clutch, each solenoid, etc. are outputted through an output expansion integrated circuit 213, and control signals over the segment indicator 72 and each LED is outputted through an output expansion integrated circuit 214.

Further, signals for controlling the back regulation plate drive motor, the side regulation plate drive motor 151*b* and the refeeding roller shift motor 150*a* are outputted from the first CPU 201 through an output expansion integrated circuit 216.

Also, the first CPU 201 is connected to the second CPU 202 through a bus 215 so that they can communicate with each other.

Signals generated from sensors which are provided for the optical system 101 and detect the state of scanning, etc. are inputted into the second CPU 202, and control signals for controlling a scan motor and a magnification selection motor are outputted therefrom.

(Control Procedure)

Figure 13:
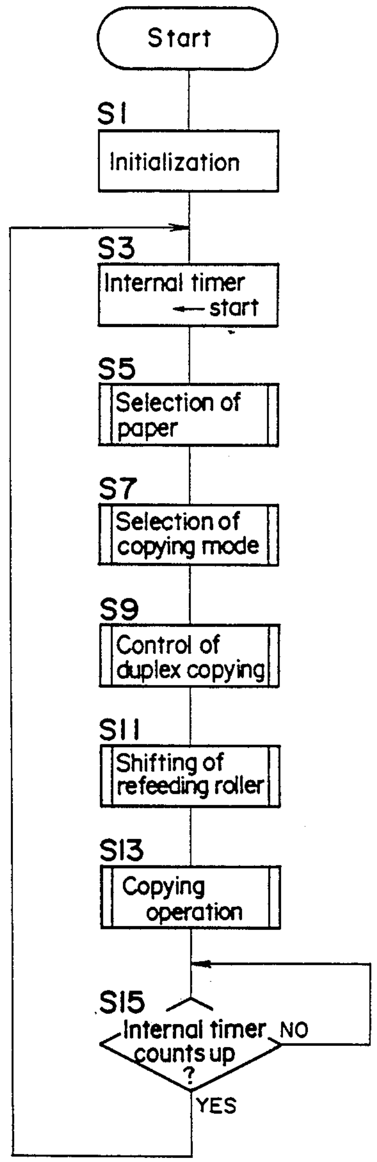
FIG. 13 is a flowchart showing a main routine for controlling a microcomputer.

Main Routine:

FIG. 13 is a flowchart showing a main routine of the first CPU 201.

First, the initialization is performed at step S1, and thereafter an internal timer which regulates a time required for one routine is started at step S3.

Subsequently, each process is executed at each step S5 through S13, and then after it is confirmed at step S15 that the internal timer which was started at step S3 counts up the time, the processing returns to step S3.

Selection of Copying Paper (step S5):

Copying paper to be used in the copying operation is selected according to the input with the paper selection key 309. For example, A3, B4, A4, A4R (A4 sized sheets are positioned with their longitudinal sides parallel to the direction of the travel of paper) and B5 can be selected as the size of the copying paper. This process is so well-known that the detailed description is omitted.

Selection of the Copying Mode (step S7):

According to the input of the duplex copying mode selection key 303 and the composite copying mode selection key 304, each copying mode is designated or canceled. This process is so well-known that the detailed description is omitted.

Control of the Duplex Copying Operation (step S9):

In a case of the operation in the duplex copying mode, the motion of the regulation plates 62, 63 and 65 which determines the size of the storing portion of the intermediate tray 58 is controlled. The detailed description of this process will be given later referring to FIGS. 14 through 18.

Further, the similar subroutine is given in order to control the composite copying operation, although it is not shown in the drawings.

Shifting of the Refeeding Roller (step S11):

In a case of the operation in the duplex copying mode, the refeeding roller 38 is controlled to get in position in order to perform the refeeding of copying paper from the intermediate tray 58. The detailed description of this process is omitted.

Copying Operation (step S13):

Here the copying operation is performed. The detailed description of this process will be given later referring FIGS. 19, 20, 21*a*, 21*b*, 22*a* and 22*b*.

Figure 14:
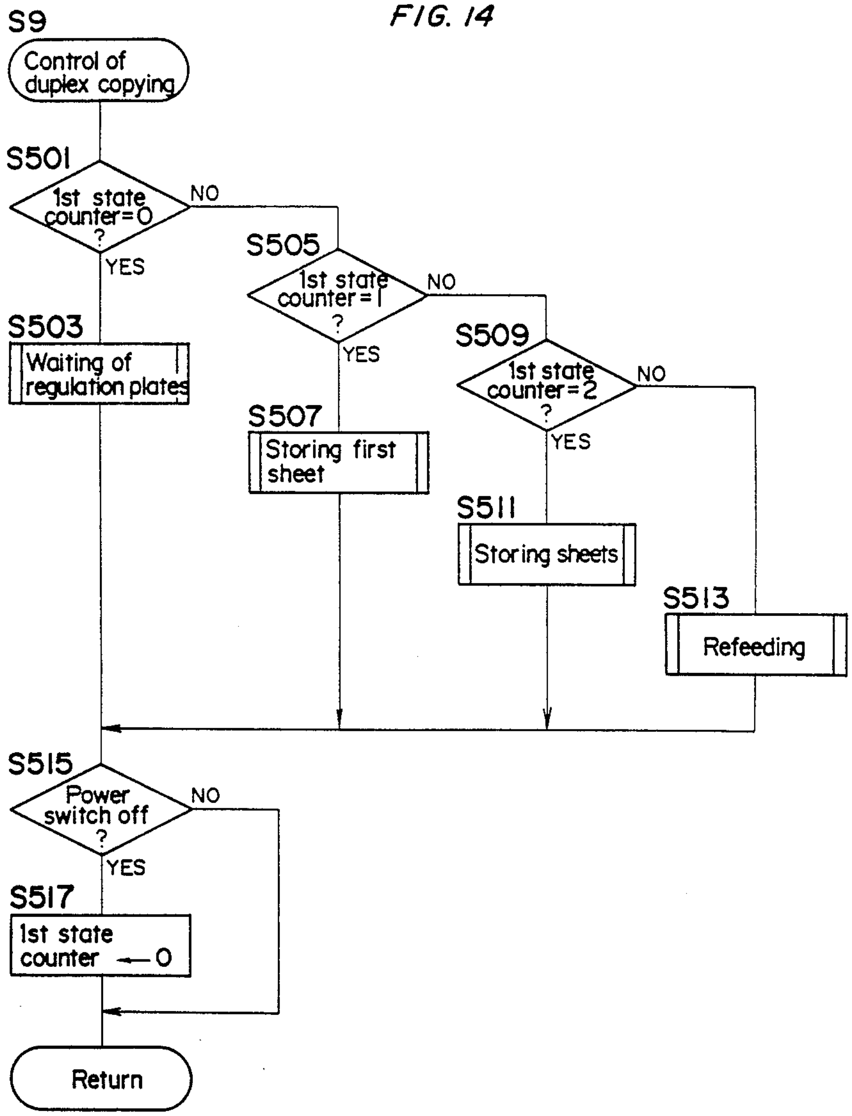
FIG. 14 is a flowchart showing a subroutine for executing the duplex copying operation.

Subroutines:

FIG. 14 is a flowchart showing a subroutine for the duplex copying operation to be executed at step S9 in the main routine.

First, the value of a first state counter is checked at steps S501, S505 and S509. Next, according to the value of the first state counter, a regulation plates waiting subroutine (the first state counter=0), a first sheet storing subroutine (the first state counter=1), a storing subroutine (the first state counter=2) or a refeeding subroutine (the first state counter=3) is called.

When a power switch is turned off (YES at step S515), the first state counter is reset at 0 at step S517. This is for the purpose of executing a completion process such as returning the regulation plates 62, 63 and 65 to their home positions. The home positions of the side regulation plates 62 and 63, as mentioned above, are the positions where the distance between themselves is the largest (the positions shown by dashed lines in FIGS. 6 and 7). The home position of the back regulation plate 65 is the position where B5 sized sheets of copying paper, the smallest size of paper toward which the copying operation is available with this copying machine can be stored, that is, the position which is apart from the edge (a point A in FIG. 3) of the intermediate tray 58 at a distance of the length of the lateral side of a B5 sized sheet (182 millimeters).

Even when the power switch is turned off, the current to the control circuitry including the first CPU 201 is maintained, so that the above-described process can be surely executed.

Figure 15:
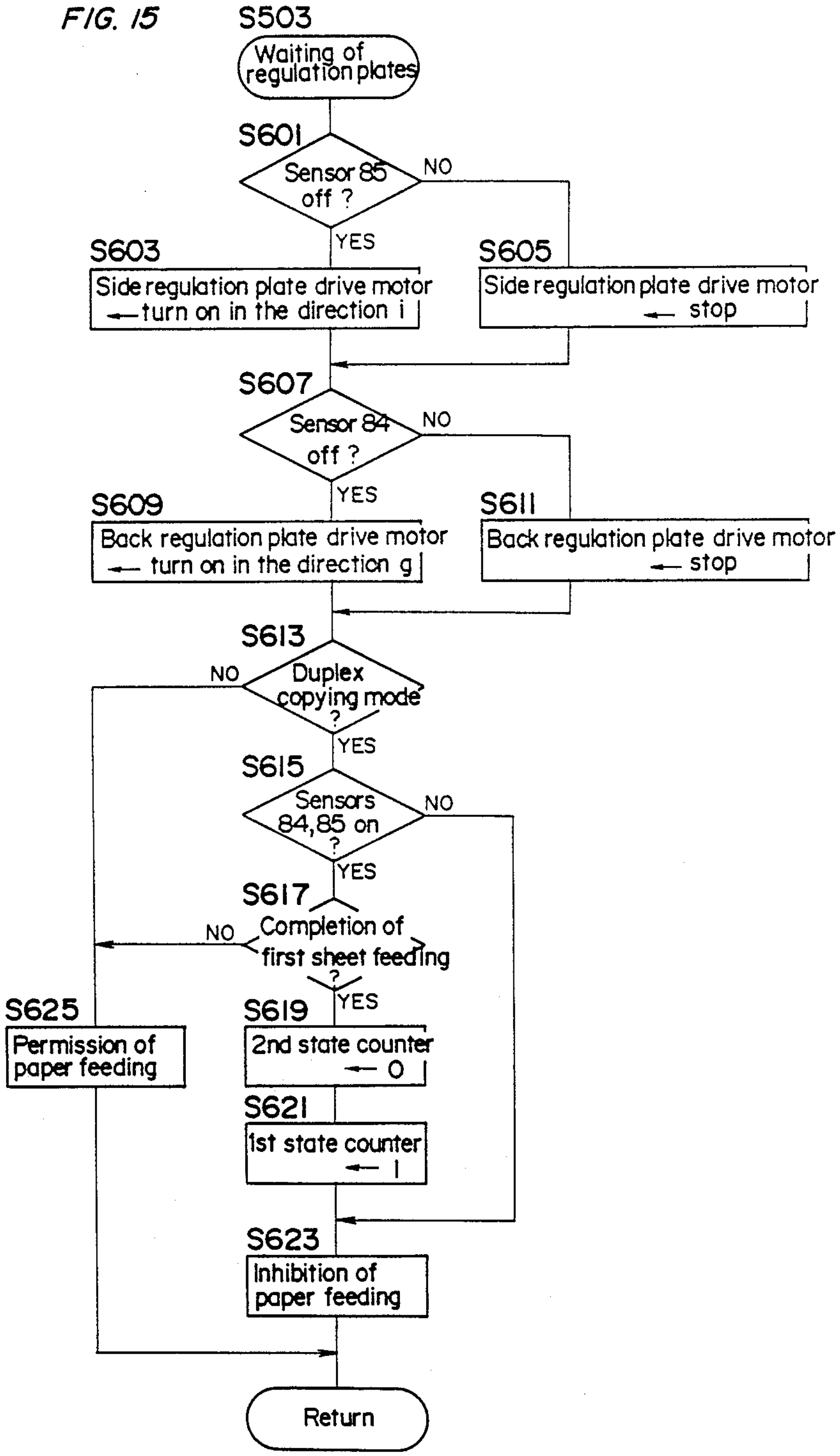
FIG. 15 is a flowchart showing a subroutine for returning the regulation plates to their home positions.
Figure 16A:
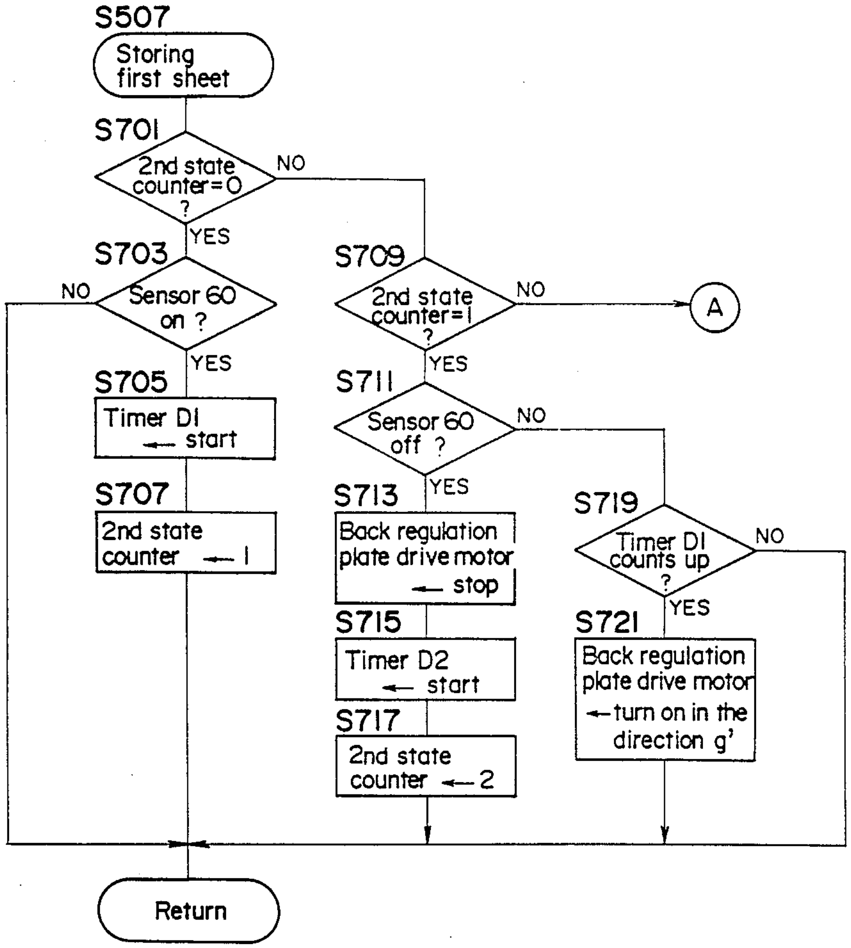
Figure 16B:
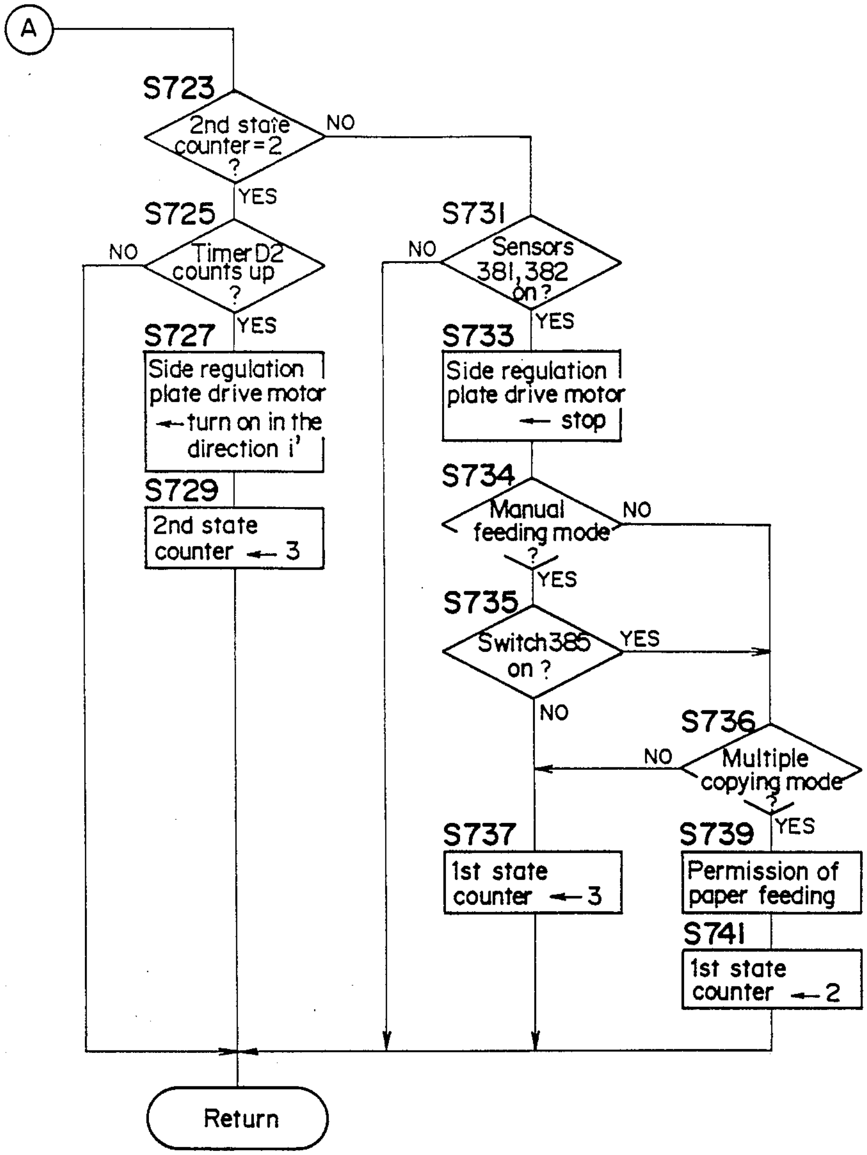

FIG. 15 is a flowchart showing the regulation plates waiting subroutine to be executed at step S503.

At steps S601 through S611, each of the regulation plates 62, 63 and 65 is returned to its home position.

Specifically, while a sensor 85 (which detects whether the side regulation plates 62 and 63 are at their home positions; refer to FIG. 5) is kept off, the side regulation plate drive motor **151*b* is turned in the direction of arrow i in FIG. 5 to drive the regulation plates 62 and 63 to separate from each other (in the directions of arrows h in FIG. 5) at steps S601 through S605**.

Also, while a sensor 84 (which detects whether the back regulation plate 65 is at its home position; refer to FIG. 2) is kept off, the back regulation plate drive motor not shown in the drawings is turned on to move the back regulation plate 65 in the direction of arrow g (refer to FIG. 3) at steps S607 through S611.

At steps S613 through S625, the permission and the inhibition of the paper feeding, the registration of the first state counter and so on are performed.

That is, in a case of the operation in the duplex copying mode (YES at step S613), when each of the regulation plates 62, 63 and 65 is at its home position (YES at step S615), and the first sheet of copying paper has not been fed (NO at step S617), the feeding of the first sheet is permitted a step S625.

On the other hand, when it is judged at step S617 that the first sheet has been fed, the first state counter is set at 1 to call the subroutine for storing the first sheet at step S621, and the feeding of the next sheet is inhibited at step S623. Also, a second state counter is reset at 0 at step S619. The second state counter controls the processing under the first sheet storing subroutine.

FIGS. **16*a* and 16*b* are flowcharts showing the first sheet storing subroutine to be executed at step S507**.

In this subroutine, the following processing is performed according to the register of the second state counter.

Each value of the second state counter indicates the following state. The value of the second state counter is kept 0 until the leading edge of the first sheet of copying paper reaches a sensor 60 (refer to FIG. 2); the value of the second state counter is kept 1 while the first sheet is passing the sensor 60; the value of the second state counter is changed to 2 when the trailing edge of the first sheet has passed the sensor 60, and the state is kept until a timer D2 counts up the time; the value of the second state counter is changed to 3 when the timer D2 finishes counting, and the state is kept until the first sheet in the next operation has been fed.

First, when the leading edge of the first sheet of copying paper is detected by the sensor 60 provided for the transporting block II of the refeeding unit 103 (YES at step S703), the timer D1 is started at step S705. Also, the second state counter is set at 1 at step S707. The time corresponding to the length of the lateral sIde of a 85 sIzed sheet (182 mIllImeters) is set into the tImer D1.

Next, if the timer D1 counts up the time (YES at step S719) while the sensor 60 still detects the sheet passing (NO at step S711), the back regulation plate drive motor is turned on to start the back regulation plate 65 moving in the direction of arrow g′ (refer to FIG. 3) at step S721. That is, when the length of the sheet to be stored in the intermediate tray 58 is longer than that of the lateral side of a B5 sized sheet (182 millimeters), the back regulation plate 65 is started moving from its home position. The movement speed of the back regulation plate 65 is set same as the transportation speed of copying paper in the transporting block II.

When the sensor 60 detects the trailing edge of the sheet passing (YES at step 711), the timer D2 is started at step S715, and the second state counter is set at 2 at step S717.

Also, if the drive motor of the back regulation plate 65 is on (refer to S721) when the sensor 60 detects the trailing edge of the sheet passing, the motor is turned off at step S713. Thereby, the back regulation plate 65 is moved in the direction of arrow g′ away from its home position at a distance corresponding to the difference between the sheet and the lateral side of a B5 sized sheet (182 millimeters) in length.

Next, when the timer D2 started at step S715 finishes counting up (YES at step S725), the side regulation plates 62 and 63 are started moving in the directions of arrows h′ (to reduce the distance between themselves; refer to FIG. 5) at step S727, and the second state counter is set at 3 at step S729. The time which is enough for the trailing edge of the sheet passing the sensor 60 to reach and be stored in the intermediate tray 58 is set in the timer D2. Accordingly, after the sheet is stored in the intermediate tray 58, the side regulation plates 62 and 63 are started moving in the directions of arrows h′.

When the side regulation plates 62 and 63 are driven to move to reduce the distance between themselves, so that both of the sensors 381 and 382 are turned on (YES at step S731), the drive motor of the side regulation plates 62 and 63 is turned off at step S733. The state that both of the sensors 381 and 382 are on, as shown in FIG. 7, means that the sheet of copying paper 81 has been positioned at the center by the side regulation plates 62 and 63.

After the sides of the sheet have been positioned (step S733), the processing goes to step S734 to check whether the sheet which was projected to the paper storing operation performed step by step as described above is the one which was fed through the manual feeding port to have the first image thereon, that is, whether the copying operation was the one in the manual feeding mode or not.

Even in a case of the copying operation in the manual feeding mode (YES at step S734), when the switch 385 is not turned on (NO at step S735), that is, in a case of the operation in the single manual feeding mode, the first state counter is set at 3 at step S737 to call the refeeding subroutine (step S513 in FIG. 14).

On the other hand, when it is judged at step S734 that the current operation is not the copying operation in the manual feeding mode (NO at step S734), and when the operation is judged the manual copying operation and also the one in the multiple manual feeding mode (YES at step S734 and YES at step S735), the processing goes to step S736 to check whether it is the operation in the multiple copying mode or not. In this moment, the multiple copying mode has two types, the one that copying paper to be projected to the copying operation is fed from one of the feeding cassettes and the one that copying paper is fed through the manual feeding port. The former is judged from the number of copy sets, and t he latter is judged from the state of the sensor 384, that is, the presence or the absence of copying paper at the manual feeding port.

When it is not the operation in the multiple copying mode in result (NO at step S736), the refeeding subroutine is called to prepare for the second image forming. Thereby, in a case of the operation in the single manual feeding mode, even if the second and other sheets are set at the manual feeding port, the refeeding subroutine is called immediately after the storing of the first sheet, so that the trouble inside the intermediate tray 58 can be prevented.

When the judgment of the multiple copying mode is made (YES at step S736), the feeding of the subsequent sheets are permitted at step S739, and the first state counter is set at 2 to call the storing subroutine at step S741 in order to prepare for the storing of the second and subsequent sheets in the intermediate tray 58.

FIG. 17 is a flowchart showing the storing subroutine to be executed at step S511.

This subroutine executes the storing of the second and subsequent sheets of copying paper in the intermediate tray 58 in a case of the duplex copying operation in the multiple copying mode (in this embodiment, including the type of multiple copying mode that copying paper to be projected to the operation is fed from one of the general feeding cassettes and the one that copying paper is fed through the manual feeding port).

Specifically, when the leading edge of a sheet of the second and after is detected by the sensor 60 (YES at step S801), a timer D3 is started at step S803. When the timer D3 finishes counting (YES at step S805), the side regulation plates 62 and 63 are moved 5 millimeters in the directions of arrows h (refer to FIG. 5). Thereby, the intermediate tray 58 can enough afford to receive the next sheet (refer to FIG. 8).

When the trailing edge of a sheet of the second and after is detected by the sensor 60 (YES at step S809), a timer D4 is started at step S811, and when the timer D4 finishes counting (YES at step S813), the side regulation plates 62 and 63 are moved 5 millimeters in the directions of arrows h' (refer to FIG. 5). Thereby, the sheet which has just come into the intermediate tray 58 and the sheets which have been stored therein are aligned in the center as shown in FIG. 7.

Next, it is checked at step S817 whether the number of copying paper stored in the intermediate tray 58 corresponds to the designated number of copy sets. When they do not correspond to each other, the processing returns to the subroutine for the duplex copying operation (FIG. 14), and the operation under the storing subroutine is repeated.

When it is judged at step S817 that the number of copying paper stored in the intermediate tray 58 corresponds to the designated number of copy sets, the first state counter is set at 3 to call the refeeding subroutine at step S819, thereby preparing for the second image forming.

Further, the number of copying paper stored in the intermediate tray 58 can be judged from the count of signals outputted from a sensor provided for the path leading paper to the refeeding unit 103, the number of the first image forming performed in a refeeding mode (which means both of the duplex copying mode and the composite copying mode) or the like.

FIG. 18 is a flowchart showing the refeeding subroutine to be executed at step S513.

After the refeeding roller 38 is finished descending (YES at step S901), the refeeding of copying paper from the intermediate tray 58 is permitted at step S903.

Further, when the refeeding of all the copying paper which has been stored in the intermediate tray 58 is completed (YES at step S905), the first state counter is reset at 0 at step S907 to prepare for the next duplex copying operation.

As described above, copying paper is stored in the intermediate tray 58 and refed to the image forming section 102.

FIG. 19 is a flowchart showing the copying operation subroutine to be executed at step S13 in the main routine.

This subroutine comprises a feeding procedure (step S101; which will be described later), a paper transporting procedure (step S103), a copy processing procedure (step S105) and a fixing procedure (step S107).

In the feeding procedure (step S101), copying paper is transported from one of the feeding ports to the front of the timing roller 13 in the image forming section 102.

In the paper transporting procedure (step S103), the paper transported to the timing roller 13 is guided to the ejection tray 36 or the paper path 530.

The copy processing procedure (step S105) controls the operation of the image forming devices arranged around the photosensitive drum 2.

The fixing procedure (step S107) controls the temperature of the fixing roller 9.

Regarding the paper transporting procedure (step S103), the copy processing procedure (step S105) and the fixing procedure (step S107), conventional ways are adopted, so that the detailed description of them is omitted.

FIG. 20 is a flowchart showing the feeding subroutine to be executed at step S101.

When the upper cassette 42 is selected as a feeding port (YES at step S201), an upper cassette feeding procedure (step S203) is executed. When the lower cassette 43 is selected as a feeding port (YES at step S205), a lower feeding procedure (step S207) is executed. Further, regarding the upper feeding procedure and the lower feeding procedure, conventional ways are adopted, so that the detailed description is omitted.

When neither the upper cassette 42 nor the lower cassette 43 is selected, and the multiple manual feeding switch 385 is off (YES at step S209), a single manual feeding procedure (step S211; which will be described later) is executed. When neither the upper cassette 42 nor the lower cassette is selected, and the multiple manual feeding switch 385 is on (NO at step S209), a multiple manual feeding procedure (step S213; which will be described later) is executed.

Figure 21A:
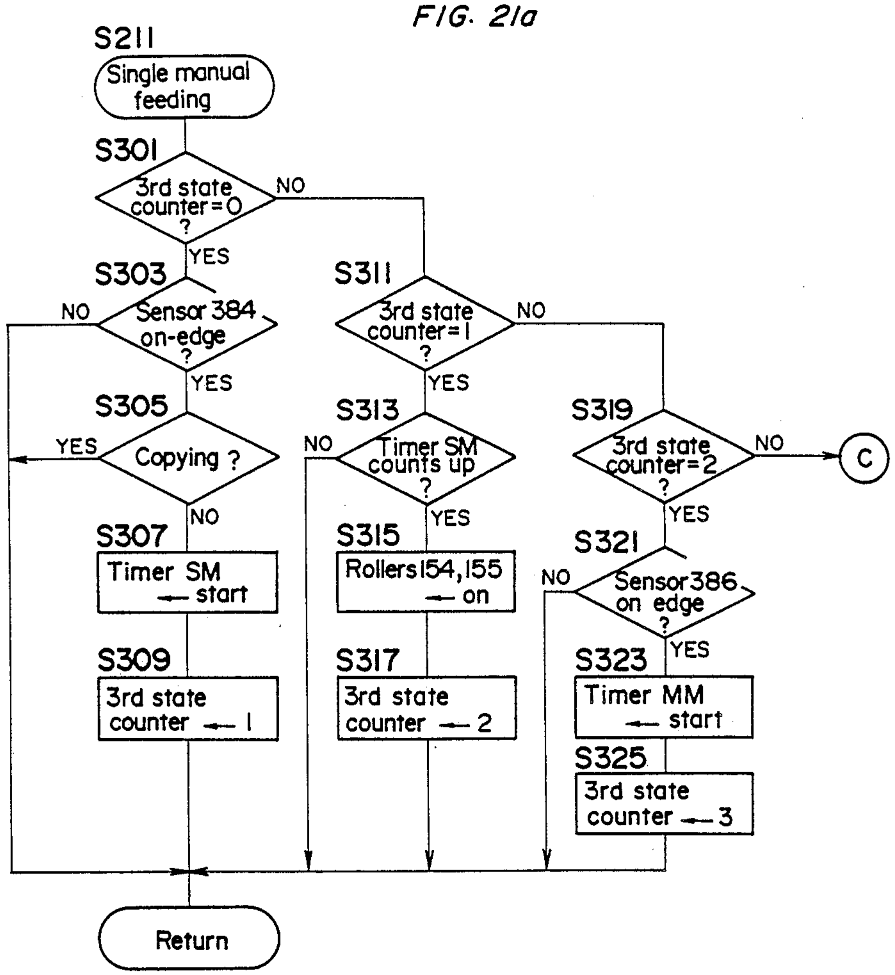
Figure 21B:
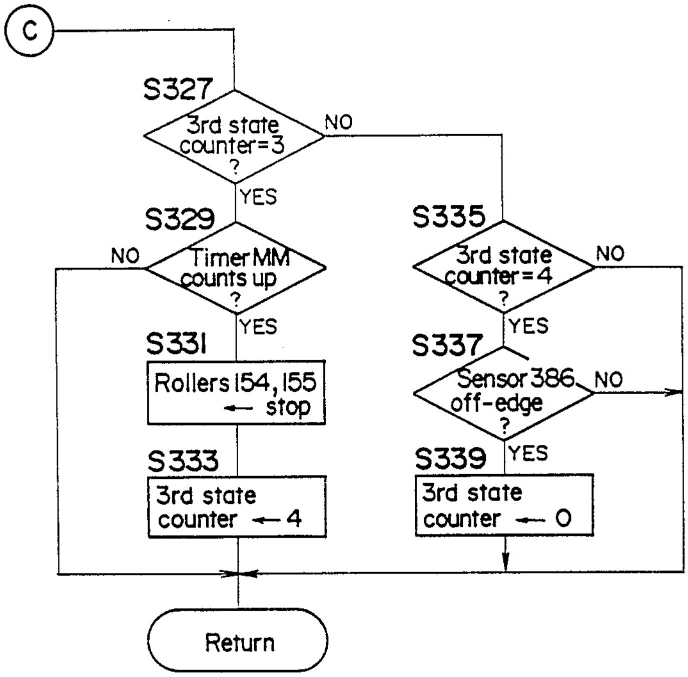

FIGS. 21*a* and 21*b* are flowcharts showing a subroutine for the single manual feeding procedure to be executed at step S211.

In this subroutine, the following processing is performed according to the value of a third state counter.

With the third state counter reset at 0 (YES at step S301), when copying paper is placed on the manual feeding table 156, thereby turning on the sensor 384 (YES at step S303), only if not in the middle of the copying operation (NO at step S305), a timer SM is started at step S307, and the third state counter is set at 1 at step S309.

When the third state counter registers 1 (YES at step S311), and the timer SM counts up the time (YES at step S313), the rollers 154 and 155 arranged in the manual feeding port are rotated at step S315, and the third state counter is set at 2 at step S317.

When the third state counter registers 2 (YES at step S319). and the sensor 386 detects the paper being fed out from the rollers 154 and 155 (YES at step S321), a timer MM is started at step S323, and the third state counter is set at 3 at step S325.

When the third state counter registers 3 (YES at step S327), and the timer MM counts up the time (YES at step S329), the rollers 154 and 155 are stopped rotating at step S331, and the third state counter is set at 4 at step S333. Thereafter, when the sensor 386 is off-edge (YES at step S337), specifically when the trailing edge of the sheet has passed the sensor 386, the third state counter is reset at 0 at step S339.

As described above, the single manual feeding is performed.

FIGS. 22*a* and 22*b* are flowcharts showing a subroutine for the multiple manual feeding operation to be executed at step S213. This subroutine, as mentioned above, is executed on condition that the multiple manual feeding switch 385 is on.

When both of the sensors 383 and 384 are on (YES at steps S401 and S405), the copying operation is permitted at step S407.

When the sensor 383 or the sensor 384 is off (NO at step S401 or NO at step S405), and when it is in the middle of the copying operation (YES at step S403), the copying operation is inhibited at step S409.

With a fourth state counter reset at 0 (YES at step S411), when the copying operation is permitted (YES at step S413), and a feeding request flag, which is set when the offedge of the print key 79*a* is detected and kept in the state until the feeding of the designated number of copying paper is completed, is set (YES at step S415), the pick-up roller 157, the rollers 154 and 155 are rotated at step S417, and the fourth state counter is set at 1 at step S419.

When the fourth state counter registers 1 (YES at step S421), and the sheet is fed from the rollers 154 and 155, thereby turnIng on the sensor 386 (YES at step S423), the timer MM is started at step S425, and the fourth state counter is set at 2 at step S427.

When the fourth state counter registers 2 (YES at step S429), and the timer MM counts up the time (YES at step S431), the pick-up roller 157, the rollers 154 and 155 are stoppēd rotating at step S433, and the fourth state counter is set at 3 at step S435.

Thereafter, when the sensor 386 is turned off (YES at step S439), the fourth state counter which has been set at 3 is reset at 0 at step S441.

As described above, the feeding operation in the multiple manual feeding mode is performed.

The above is the description of the control procedure of the apparatus of this embodiment.

Further, although the description of the multiple copying operation toward copying paper fed from the cassettes 42 and 43 which are universal type (the type of cassette which can regulate and store various sizes of sheets therein according to the size) has been omitted in the above-described embodiment, the operation can be performed in the same manner as that in the multiple manual feeding mode.

Also, in the above description of the embodiment, the description of a control procedure of the regulation plates in the composite copying mode has been omitted, but this is performed in the same manner as that in the duplex copying mode.

Although the present invention has been described in connection with the preferred embodiment thereof, it is to be noted that various changes and modifications are apparent to those who are skilled in the art. Such changes and scope of the present invention are to be understood as included within the scope of the present invention as defined by the appended claims, unless they depart therefrom.

What is claimed is:

1. A copying apparatus comprising:

image forming means provided with an image transfer portion where images are transferred onto at least one copy sheet;

manual feeding means having a tray for feeding at least one copy sheet st on said tray manually to said image transfer portion, which can be operated in a first mode where only one copy sheet of the at least one copy sheets set on said tray manually is fed out and in a second mode where a plurality of copy sheets set on said tray manually are successively fed out one by one until all the copy sheets on said tray are fed therefrom;

refeeding means for feeding copy sheets, each of which has been subjected to an image forming operation at said image transfer portion once and has an image on one side thereof, to said image transfer portion again;

mode selection means for selecting said first mode or said second mode;

first control means for controlling said refeeding means when said first mode is selected to perform the refeeding operation each time the image forming operation for a copy sheet fed from said feeding means is completed; and second control means for controlling said refeeding means when said second mode is selected to perform the refeeding operation after the completion of the successive feeding and image forming operation for all the copy sheets set on said tray manually.

2. A copying apparatus as claimed in claim 1, wherein said refeeding means comprises an intermediate tray for storing copy sheets each of which was subjected to a copying operation once and has an image on one side.

3. A copying apparatus as claimed in claim 2, wherein said refeeding means comprises means for regulating the copy sheets fed into said intermediate tray in a specified position.

4. A copying apparatus as claimed in claim 2, wherein said intermediate tray comprises adjustable regulation plates that can be adjusted to the size of the coy sheet.

5. A copying apparatus as claimed in claim 4, wherein the adjustable regulation plates comprise sensors for sensing the width of the copy sheets.

6. A copying apparatus as claimed in claim 5, wherein said refeeding means further comprises third control means for controlling the width of the adjustable regulation plates in response to the sensors.

7. A copying apparatus as claimed in claim 2, wherein said refeeding means comprises means for sensing the width of the copy sheets and adjusting the width of the intermediate tray to the width of the copy sheets.

8. A copying apparatus as claimed in claim 1, wherein said refeeding means comprises means for sensing the width of the copy sheets.

9. A copying apparatus as claimed in claim 1, wherein said refeeding means comprises detection means for detecting copy sheets set on said tray manually so that said second control means judges the completion of the feeding of all the sheets from said tray based on a signal generated by said detection means.

10. A method of controlling a copying apparatus for feeding copy sheets manually set on a manual feed tray to an image transfer portion of an image forming means so that the sheets obtain an image thereon, the method comprising the steps of:

manually setting at least one copy sheet on said tray;

selecting a first mode where only one copy sheet of at least one copy sheet manually set on said tray is fed out, or a second mode where a plurality of copy sheets on said tray are successively fed out one by one;

feeding at least one copy sheet to said image transfer portion in the selected mode;

refeeding the at least one copy sheet which has an image on one side back to said image transfer portion when said first mode is selected, each time the image forming operation for a copy sheet fed out from said tray is completed; and refeeding the copy sheets each of which obtained an image on one side back to said image transfer portion, when said second mode is selected, after the completion of the successive feeding and image forming operation for all the copy sheets set on said tray manually.

11. A copying apparatus comprising:

image forming means comprising an image forming portion for transferring images onto at least one copy sheet;

manual feeding means comprising a tray for feeding at least one copy sheet manually set on said tray to said image transfer portion;

means for setting a manual feed first mode in which only one copy sheet of the at least one copy sheet manually set on said tray is fed by said manual feeding means and a manual feed second mode in which a plurality of copy sheets are fed by said manual feeding means;

refeeding means for storing at least one copy sheet received from said image forming means and for refeeding the stored at least one copy sheet to said image forming means, said refeeding means comprising an intermediate tray for receiving the at least one copy sheet, sensors for sensing the width of the at least one copy sheet received therein and control means for adjusting the width of said intermediate tray for regulating the position of the at least one copy sheet in said intermediate tray;

first control means for controlling said refeeding means when said first mode is set to perform the refeeding operation each time the image forming operation for one copy sheet fed from said feeding means is completed; and second control means for controlling said refeeding means when said second mode is set to perform the refeeding operation after the completion of the successive feeding and image forming operation for all the copy sheets manually set on said tray.

* * * * *